United States Patent
Schultz et al.

(10) Patent No.: US 9,454,747 B2
(45) Date of Patent: Sep. 27, 2016

(54) ORDERING OF CONVERSATIONS BASED ON MONITORED RECIPIENT USER INTERACTION WITH CORRESPONDING ELECTRONIC MESSAGES

(75) Inventors: David Schultz, Seattle, WA (US);
Michael R. Longe, Seattle, WA (US);
W. Karl Renner, Great Falls, VA (US)

(73) Assignee: AOL Inc., Dulles, VA (US)

( * ) Notice: Subject to any disclaimer, the term of this patent is extended or adjusted under 35 U.S.C. 154(b) by 1870 days.

(21) Appl. No.: 12/089,852

(22) PCT Filed: Oct. 11, 2006

(86) PCT No.: PCT/US2006/039718
§ 371 (c)(1),
(2), (4) Date: Jul. 30, 2008

(87) PCT Pub. No.: WO2007/044806
PCT Pub. Date: Apr. 19, 2007

(65) Prior Publication Data
US 2009/0138828 A1    May 28, 2009

Related U.S. Application Data

(60) Provisional application No. 60/724,884, filed on Oct. 11, 2005.

(51) Int. Cl.
*G06F 3/048* (2013.01)
*G06Q 10/10* (2012.01)

(52) U.S. Cl.
CPC ..................................... *G06Q 10/10* (2013.01)

(58) Field of Classification Search
USPC ......................................................... 715/753
See application file for complete search history.

(56) References Cited

U.S. PATENT DOCUMENTS

| | | |
|---|---|---|
| 2003/0220977 A1 | 11/2003 | Malik |
| 2005/0044143 A1 | 2/2005 | Zimmerman |
| 2005/0071435 A1* | 3/2005 | Karstens ........................ 709/207 |
| 2006/0235933 A1* | 10/2006 | Baluja ..................... H04L 51/26 |
| | | 709/207 |

OTHER PUBLICATIONS

Shelley O'Hara, "Easy Microsoft Office Outlook 2003," Sep. 2003.*
Vayusphere Inc., "Products—Vayusphere Instant Response Server (IRiS)," Apr. 2005.*
PCT International Search Report and Written Opinion for PCT/US2006/039718, dated Jul. 9, 2007; (6 pgs.).

* cited by examiner

*Primary Examiner* — William Trapanese
(74) *Attorney, Agent, or Firm* — Finnegan, Henderson, Farabow, Garrett & Dunner LLP

(57) ABSTRACT

A system and computer-implemented method includes presenting a user interface having a visual representation for each of multiple ongoing conversations involving a recipient user identity who is associated with each of the conversations. Message activity of the recipient user identity with respect to one or more of the multiple ongoing conversations is monitored and activity level associated with at least one incoming message for a recipient user identity is identified based upon the monitored message activity. The monitored message activity includes the recipient user identity's interaction with a conversation associated with the incoming message. A relative hierarchy for the ongoing conversations is determined based on the activity level associated with the at least one incoming message, and the user interface is arranged such that a conversation associated with an incoming message having a relatively high activity level is positioned to reflect hierarchical prominence in comparison to another conversation associated with an incoming message having a relatively low activity level.

48 Claims, 15 Drawing Sheets

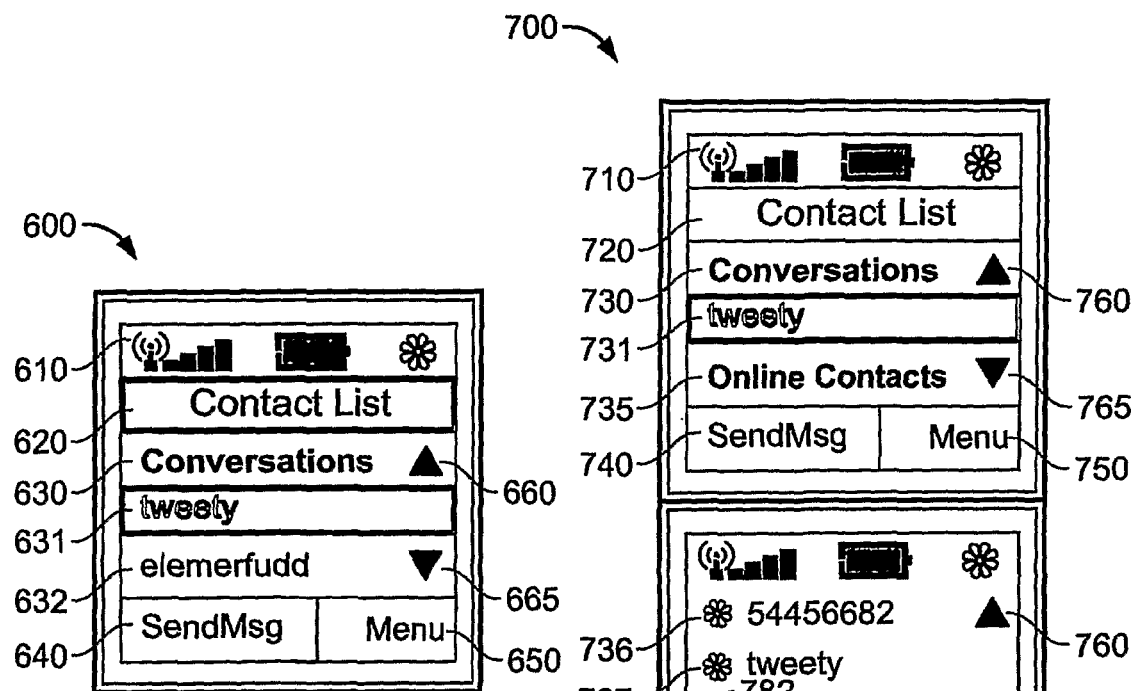
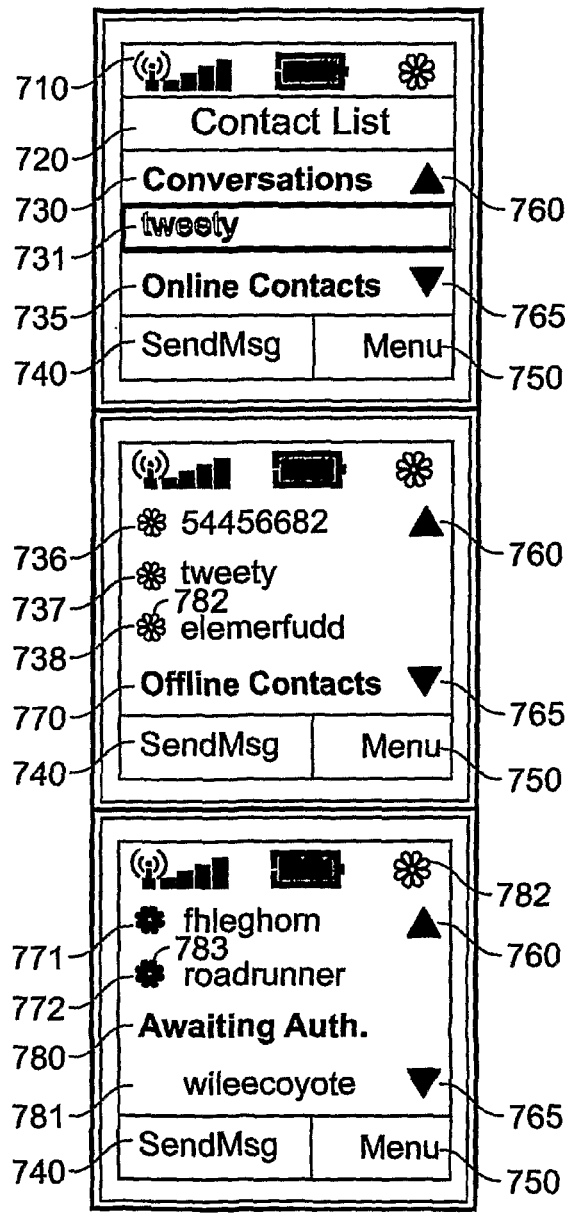
FIG. 6
FIG. 7

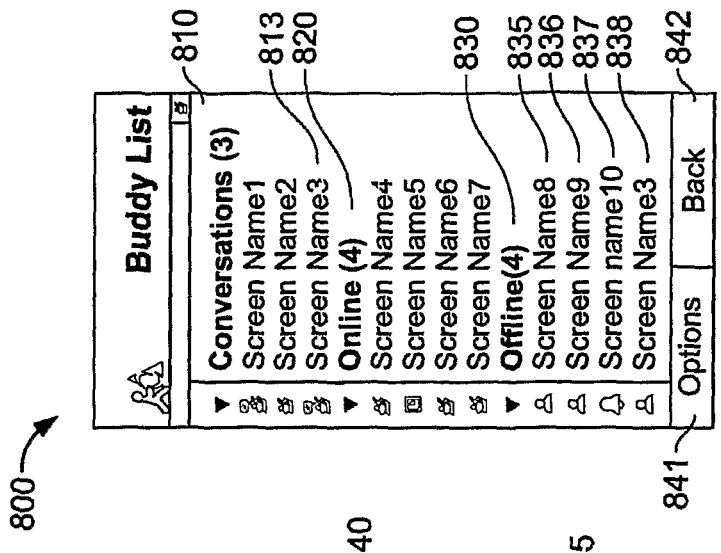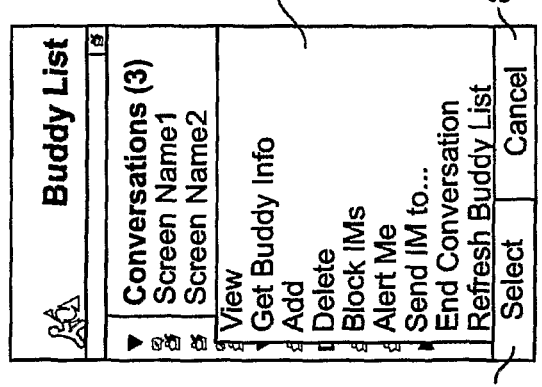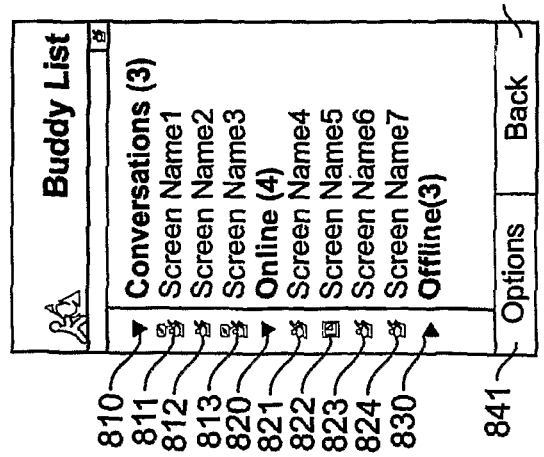

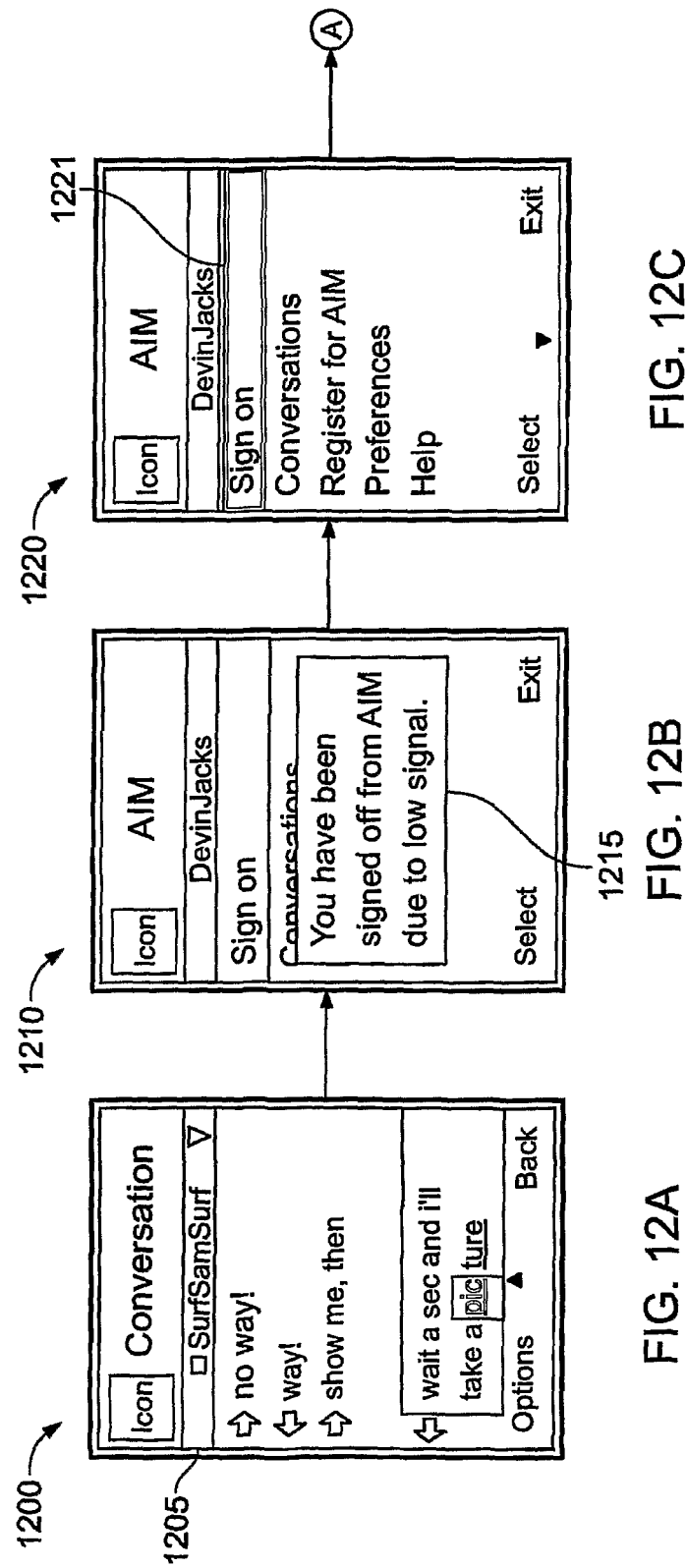

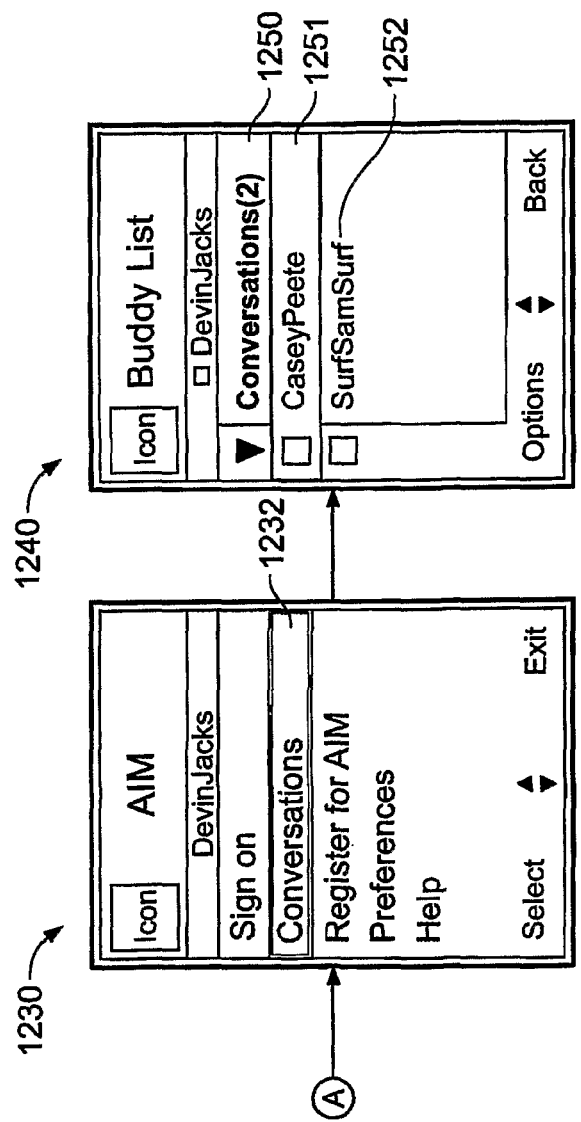

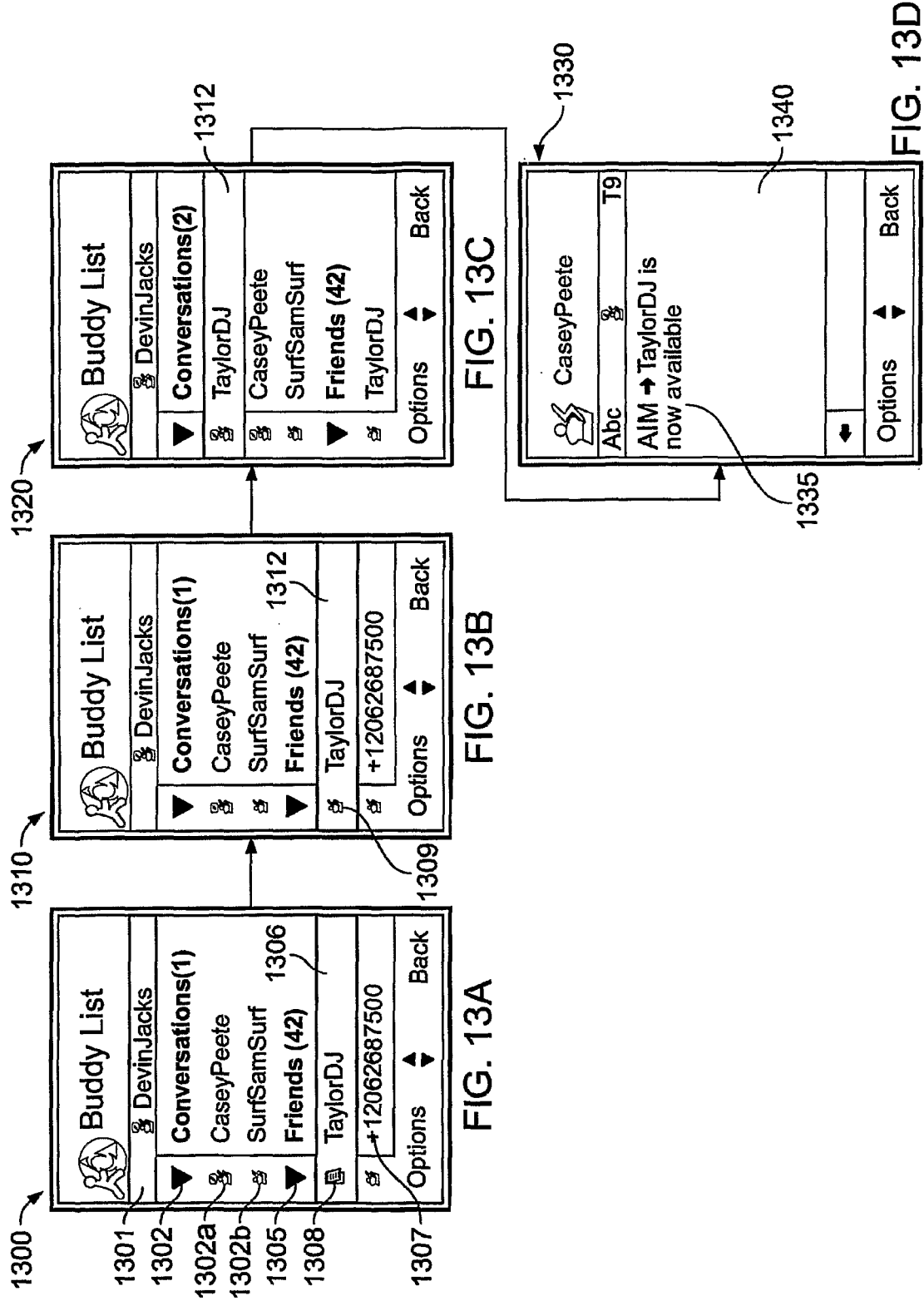

ORDERING OF CONVERSATIONS BASED ON MONITORED RECIPIENT USER INTERACTION WITH CORRESPONDING ELECTRONIC MESSAGES

CROSS REFERENCE TO RELATED APPLICATION

The application claims priority to U.S. Provisional Application No. 60/724,884, filed Oct. 11, 2005, and titled ACTIVITY-BASED ORDERING OF MOBILE INSTANT MESSAGING AND GROUP CHAT, which is hereby incorporated by reference in its entirety.

TECHNICAL FIELD

This application relates to communications systems configured to order conversions based on monitored recipient user interaction with corresponding electronic messages.

BACKGROUND

Instant messaging is a popular form of communication across the Internet. Instant messaging is primarily used to enable communications instantaneously and notoriously between two or more instant messaging users for whom presence may be monitored. To access an instant messaging service, a user connects to the Internet and authenticates themselves to the service with whom they've previously registered, typically by providing a user identity (e.g., a screen name) and a password to the instant messaging service. Once a user is logged in, the presence of that user (i.e., the availability of that user to receive instant messages) is made available by the instant messaging system to authorized partners (i.e., "buddies). The user may then engage in typed conversations with other instant messaging users connected to the system. As instant messaging and group chat conversations have migrated to mobile client devices, such as personal digital assistants (PDAs) or mobile telephones, the efficient management of instant messaging and group chat conversations includes optimizing available screen space and/or user controls, such as scroll wheels or scroll bars on PDAs or mobile telephones.

SUMMARY

In one general aspect, a computer-implemented method includes presenting a user interface having a visual representation for each of multiple ongoing conversations involving a recipient user identity who is associated with each of the conversations. Message activity of the recipient user identity is monitored with respect to one or more of the multiple ongoing conversations based on interaction of the recipient user identity with at least one incoming message. Activity level associated with at least one of the ongoing conversations is identified for the recipient user identity based upon the monitored message activity. A relative hierarchy for the ongoing conversations is determined based on the activity level associated therewith. The user interface is arranged such that a conversation having a relatively high activity level is positioned to reflect hierarchical prominence in comparison to another conversation having a relatively low activity level.

Implementations of this aspect may include one or more of the following features. For example, at least one incoming message may be associated with recipient user identity interaction with the conversation and the conversation is displayed in the user interface. At least one incoming message may be associated with a most recently viewed conversation for the recipient user identity. At least one incoming message may be associated with the message most recently sent by the recipient user identity. Identifying the recipient user identity activity level may include determining if the incoming message is associated with a conversation most recently viewed by the recipient user identity. Identifying the recipient user identity activity level may further include determining if the most active incoming message is associated with an outgoing message most recently sent by the recipient user identity. Identifying the recipient user identity activity level may further include determining if the most active incoming message is a message most recently received for the recipient user identity. Identifying the recipient user identity activity level may include determining if the most active incoming message is associated with an outgoing message most recently sent by the recipient user identity. Identifying the recipient user identity activity level further includes determining if the most active incoming message is associated with a conversation most recently viewed by the recipient user identity. Identifying the recipient user identity activity level may further include determining if the most active incoming message is a message most recently received message for the recipient user identity.

A lesser active conversation may be removed from the user interface upon reaching a predetermined number of conversations. A lesser active incoming message may be queued upon reaching a predetermined number of messages. A lesser active conversation may be removed from the user interface upon reaching a predetermined amount of memory. A lesser active incoming message may be queued upon reaching a predetermined amount of memory. Incoming messages received by the recipient user may be repeatedly evaluated according to a predetermined time interval, including evaluating queued messages that have not been viewed by the recipient user. An indicator may be provided to the recipient user identity reflecting arrival of a most active incoming message. Incoming messages associated with an active conversation may be queued until all previously received messages in the active conversation have been viewed by the recipient user identity. The user interface may be arranged by reordering incoming messages periodically after a predetermined interval of elapsed time.

An incoming message may be deemphasized within the user-interface relative to another incoming message based on a determination that the incoming message is less active than the other incoming message. The user interface may emphasize an active incoming message with an indicator notifying the recipient user identity of an incoming message. An active incoming message may be emphasized within the user interface. Identifying the recipient user identity activity level may include determining whether a predetermined condition is satisfied based upon the monitored message activity. Incoming messages may be queued until the predetermined condition is satisfied. Incoming, lesser active messages may be queued until the predetermined condition is satisfied. The predetermined condition may be satisfied when a predetermined time period has elapsed. The predetermined condition may be satisfied when a subsequent, more active incoming message is received for the recipient user identity. The predetermined condition may be satisfied when a predetermined amount of memory is available for managing incoming messages. The predetermined condition may be satisfied if the recipient user identity's activity is active within the user interface for at least a predetermined amount of time. The user interface may be a list-driven user interface. The user interface may be a list-driven user interface for a mobile client device. The mobile client device may be a mobile telephone, a personal digital assistant, or a desktop computer. The user interface may be one or more of a list-driven user interface for a desktop computer, a pop-up windows interface for electronic messaging, an instant messaging user interface, a group chat conversation user interface, and/or an e-mail messaging user interface.

An indication may be provided to a sending user identity of an incoming message that the recipient user identity has not received notification of the incoming message. Providing an indication to a sending user identity of an incoming message that the recipient user identity has not viewed the incoming message. The activity level of the recipient user identity may include monitoring activity of the recipient user identity within the user interface. The recipient user identity may be enabled to respond to the most active incoming message by selecting a predetermined message from among a set of predetermined messages and delivering the predetermined message to a sending user identity of the most active incoming message.

In another general aspect, a computer-implemented system presents a user interface having a visual representation for each of multiple ongoing conversations involving a recipient user identity who is associated with each of the conversations. Message activity of the recipient user identity is monitored with respect to one or more of the multiple ongoing conversations based on interaction of the recipient user identity with at least one incoming message. Activity level associated with at least one of the ongoing conversations is identified for the recipient user identity based upon the monitored message activity. A relative hierarchy for the ongoing conversations is determined based on the activity level associated therewith. The user interface is arranged such that a conversation having a relatively high activity level is positioned to reflect hierarchical prominence in comparison to another conversation having a relatively low activity level.

Implementations of this aspect may include one or more of the following features. For example, the interface is a list-defined user interface and/or a pop-up windows user interface.

In another general aspect, a computer-readable medium having computer-executable instructions contained therein for performing a method, the method including presenting a user interface having a visual representation for each of multiple ongoing conversations involving a recipient user identity who is associated with each of the conversations. Message activity of the recipient user identity is monitored with respect to one or more of the multiple ongoing conversations based on interaction of the recipient user identity with at least one incoming message. Activity level associated with at least one of the ongoing conversations is identified for the recipient user identity based upon the monitored message activity. A relative hierarchy for the ongoing conversations is determined based on the activity level associated therewith. The user interface is arranged such that a conversation having a relatively high activity level is positioned to reflect hierarchical prominence in comparison to another conversation having a relatively low activity level.

In another general aspect, a method for receiving a message on a mobile client device includes monitoring incoming messages associated with a recipient user identity, wherein the incoming messages include at least one of instant messages or group chat conversations. A most active incoming message is identified from the incoming messages based upon the monitored message activity for the recipient user identity. The most active incoming message is promoted to an emphasized position in a user interface, the promotion of the most active incoming message being initiated by satisfying a predetermined condition relating to the monitored message activity, wherein the predetermined condition includes one or more of an occurrence of the recipient user identity viewing a conversation relating to the most active incoming message, or the user identity sending an outgoing message relating to the most active incoming message.

Implementations of this aspect may include one or more of the following features. For example, the most active incoming message may be promoted according to a predetermined time interval.

In another general aspect, a computer-implemented system monitors incoming messages associated with a recipient user identity, wherein the incoming messages comprise at least one of instant messages or group chat conversations. A most active incoming message is identified from the incoming messages based upon the monitored message activity for the recipient user identity. The most active incoming messages are promoted to an emphasized position in a user interface, the promotion of the most active incoming message being initiated by satisfying a predetermined condition relating to the monitored message activity, wherein the predetermined condition includes one or more of an occurrence of the recipient user identity viewing a conversation relating to the most active incoming message, or the user identity sending an outgoing message relating to the most active incoming message.

In another general aspect, a computer-readable medium having computer-executable instructions contained therein for performing a method, includes instructions for monitoring incoming messages associated with a recipient user identity, wherein the incoming messages comprise at least one of instant messages or group chat conversations. A most active incoming message is identified from the incoming messages based upon the monitored message activity for the recipient user identity. The most active incoming message is promoted to an emphasized position in a user interface, the promotion of the most active incoming message being initiated by satisfying a predetermined condition relating to the monitored message activity. The predetermined condition includes one or more of an occurrence of the recipient user identity viewing a conversation relating to the most active incoming message, or the user identity sending an outgoing message relating to the most active incoming message.

The details of one or more implementations are set forth in the accompanying drawings and the description below. Other features will be apparent from the description and drawings, and from the claims.

DESCRIPTION OF DRAWINGS

FIG. 6 is an exemplary screenshot of a conversation section of a contact list for a mobile client device.

FIG. 7 is an exemplary screenshot of an expanded contact list for a mobile client device.

FIGS. 8A-8C include exemplary screenshots of a list-defined user interface showing active conversations, online user identities, and offline user identities.

FIGS. 12A-E are exemplary screenshots showing the maintenance of ongoing conversations while a user identity is logged out of a system.

FIGS. 13A-D are exemplary series of screenshots showing the dynamic reordering of a new conversation with an online user to a first position on a list-defined user interface.

DETAILED DESCRIPTION

Figure 1:
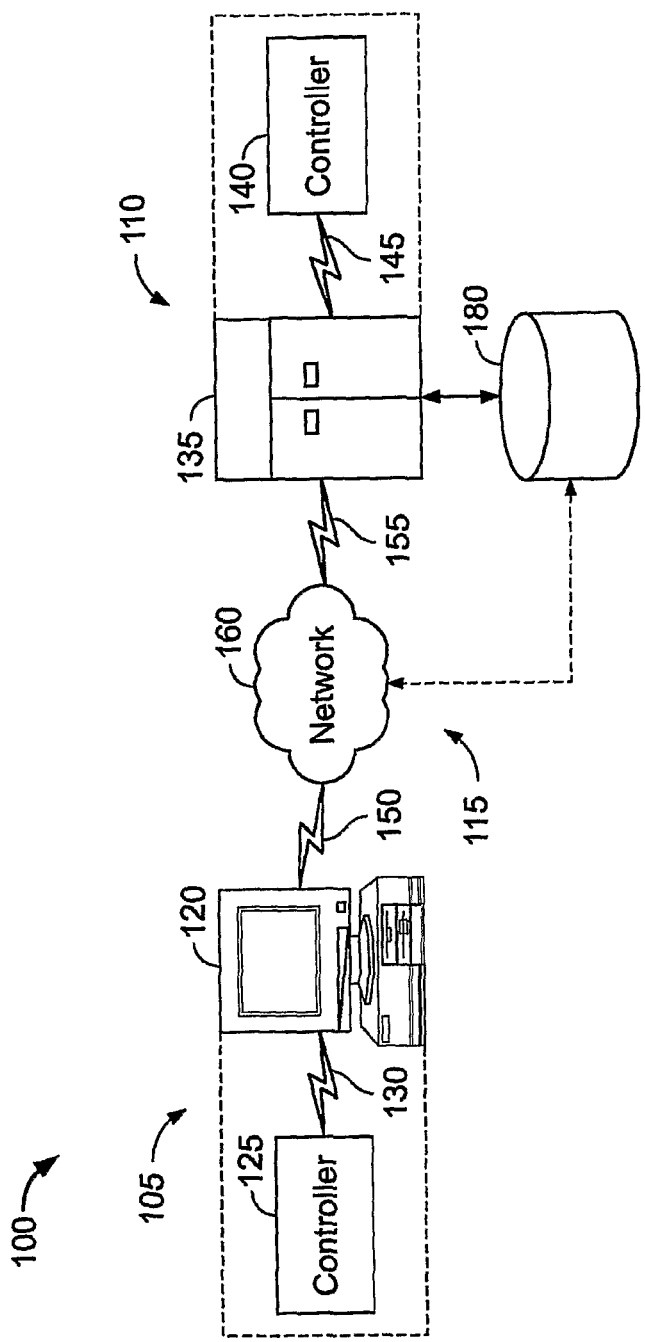
FIG. 1 is a block diagram of a communications system.

Instant messaging and group chat conversations appearing in a client device, such as a wireless device, are promoted to positions readily accessible by the user identity, such as the top of a list-defined user interface, based on relative recently of recipient user message activity. For example, in one implementation, message conversations or chat groups are sorted by recent activity to enable a recipient user identity to be alerted to a new message that has arrived and that is related to the most active message conversation or chat group. For example, a recipient user identity's message activity is monitored and a most active incoming message is identified based upon the monitored message activity. The most active incoming message is associated with one or more of a conversation most recently viewed by the user identity, an outgoing message most recently sent by the user identity, and/or a message most recently received for (e.g., on behalf of) the recipient user identity. The most active incoming message is promoted to a prominent position, such as in a pop-up window or list-defined user interface, based on the monitored message activity. Least active messages may be removed or demoted based on available memory space, available screen space (also known as screen real estate), or based on predetermined, elapsed time periods.

In order to prevent the recipient user identity from becoming overwhelmed by incoming messages from several ongoing conversations, the incoming messages and the related conversations are promoted conservatively to ensure that messages relating to the most active conversation or message activity are promoted to prominent positions in a user interface. In addition, most recently received messages may not be promoted automatically to prominent positions if previously received messages for more active conversations, or the current conversation, have not yet been viewed by the recipient user identity on the client device.

In the context of an instant messaging or group chat messaging environment, a conversation may include one or more instant messages or chats exchanged between members of the messaging community or session. In a mobile client device, e.g., where screen space and available memory may be limited, a user's conversations will be easily accessed if the active conversation is quickly and easily accessible by the user. Furthermore, a list of conversations integrated into a contact list, e.g., where buddy groups and conversations are listed on the same interface, provides ease of access to the user messaging with a mobile client device. For example, listing the conversations at the top of a contact list provides an overall user experience that is complemented by access to active conversations without necessarily requiring the use of unnecessary user inputs, such as manipulating a scroll wheel on a mobile client device.

In addition, the number of conversations may be limited, such as to a predetermined number of conversations or by limited available memory, by the user or automatically by the system. For example, if a user is presented with too many conversations within a screen space, the contact list may be longer, and thus more time consuming, to scroll through. Alternatively, or additionally, users may be provided with the option to save and access the conversations offline rather than maintaining a large number of conversations on the contact list, e.g., inactive conversations may be queued for later access and/or manually or automatically removed from the active user interface.

Figure 2:
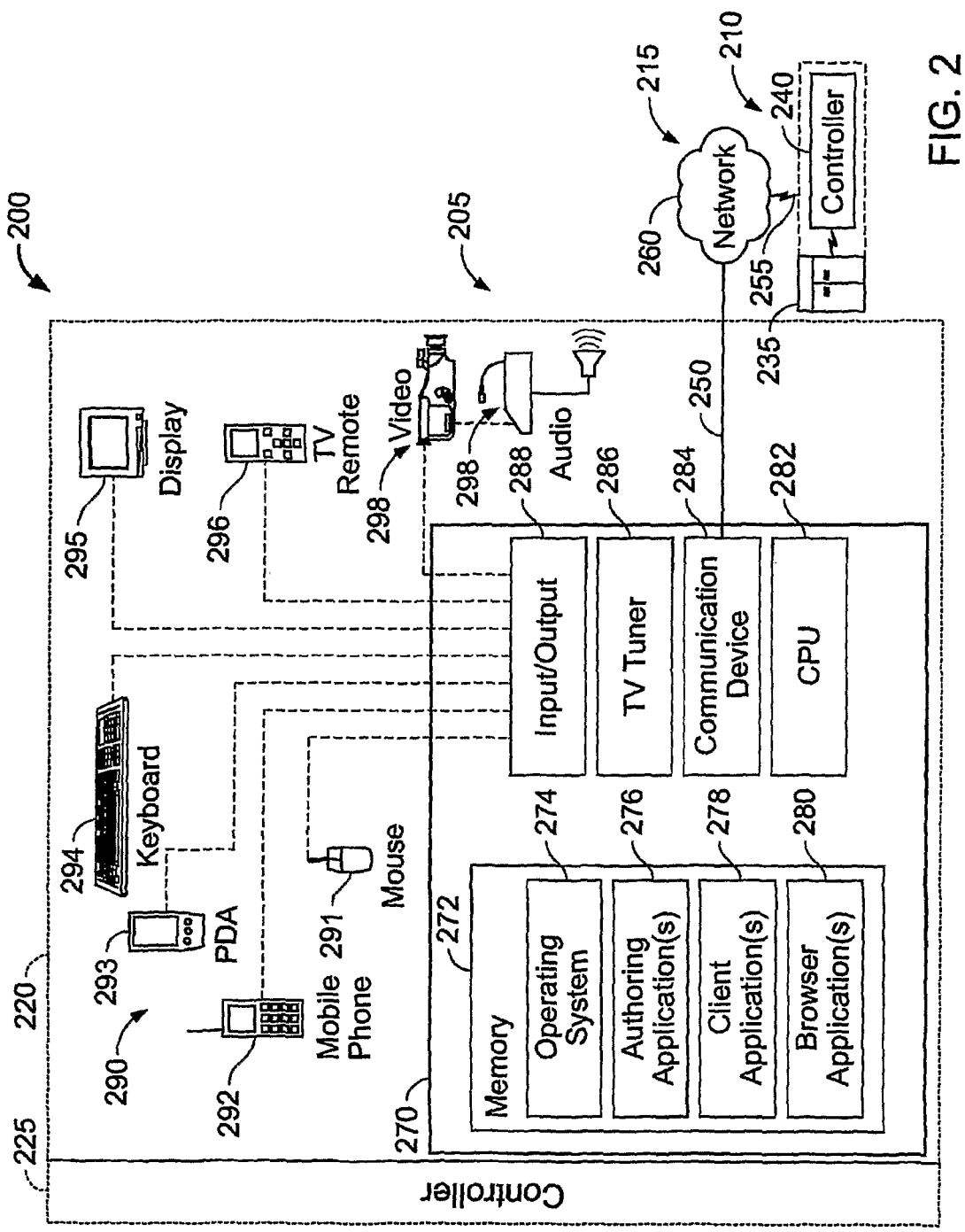
FIGS. 2 and 3 are expansions of the block diagram of FIG. 1.
Figure 3:
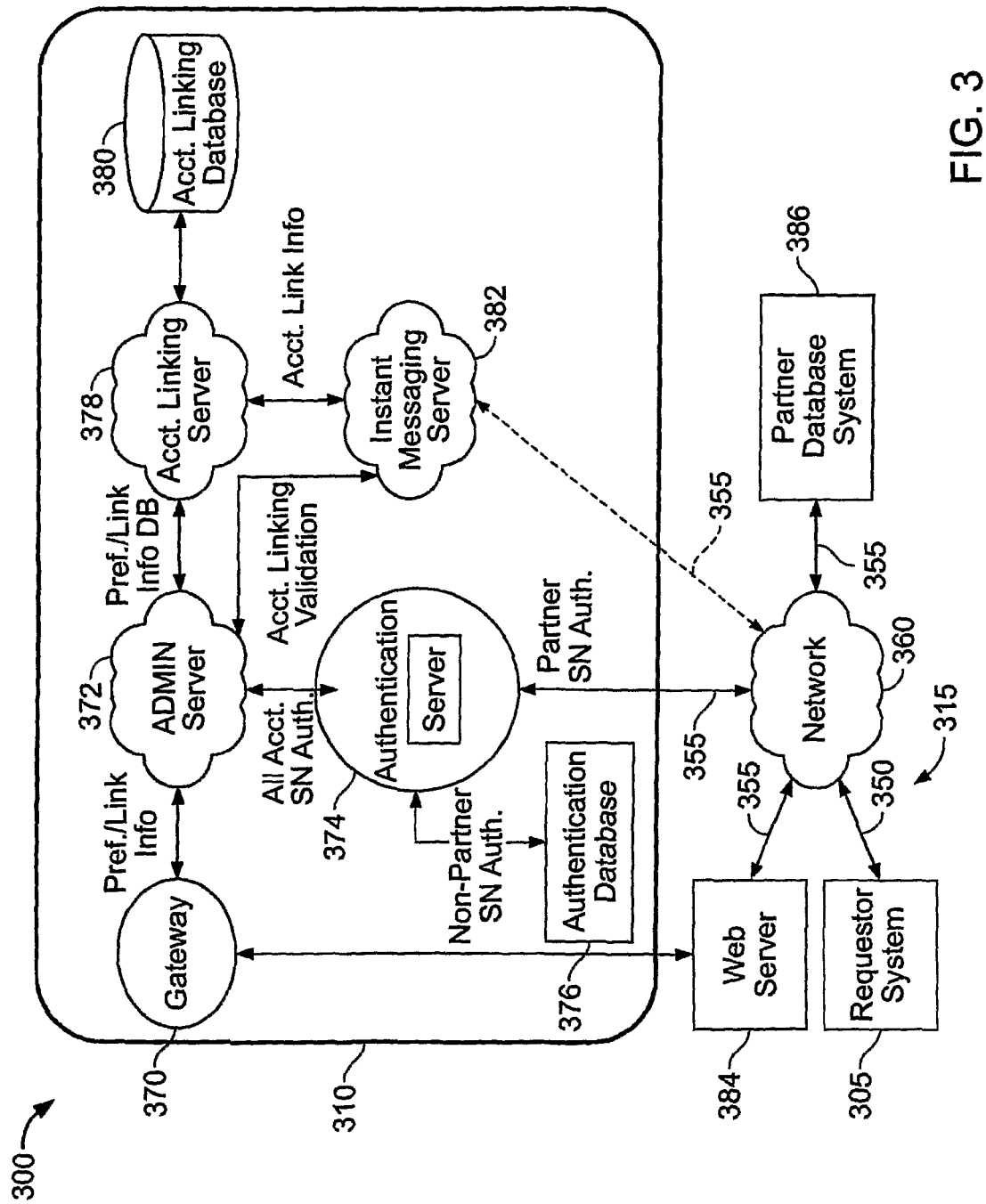

For illustrative purposes, FIGS. 1-3 show an example of a communications system for implementing techniques for transferring electronic data from a host messaging system to a mobile device, e.g., such as a telephone or PDA. For brevity, several elements in the figures described below are represented as monolithic entities. However, these elements each may include numerous interconnected computers and components designed to perform a set of specified operations and/or may be dedicated to a particular geographical region.

Referring to FIG. 1, a communications system 100 is capable of delivering and exchanging data between a requestor system 105 and a provider system 110 through a communications link 115. The requester system 105 may include a client system and the provider system 110 may include a host system. The requestor system 105 typically includes one or more requestor devices 120 and/or requestor controllers 125, and the provider system 110 typically includes one or more provider devices 135 and/or provider controllers 140. For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requester system 105 and the provider system 110 may be arranged to operate within or in concert with one or more other systems, such as, for example, one or more Local Area Networks ("LANs") and/or one or more Wide Area Networks ("WANs").

The provider system 110 may include a communication interface such as an electronic mail gateway. For instance, the provider system 110 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 110 enables communications between the provider system 110 and other systems through, for example, communications link 115.

The requestor device 120 (or the provider device 135) is generally capable of executing instructions under the command of a requestor controller 125 (or a provider controller 140). The requestor device 120 (or the provider device 135) is connected to the requestor controller 125 (or the provider controller 140) by a wired or wireless data pathway 130 or 145 capable of delivering data.

The requestor device 120, the requester controller 125, the provider device 135, and the provider controller 140 each typically include one or more hardware components and/or software components. An example of a requester device 120 or a provider device 135 is a general-purpose computer (e.g., a personal computer) capable of responding to and executing instructions in a defined manner. Other examples include a special-purpose computer, a workstation, a server, a hand-held device, a component, other physical or virtual equipment or some combination thereof capable of responding to and executing instructions. The requestor device 120 and the provider device 135 may include devices that are capable of peer-to-peer communications.

An example of a requestor controller 125 or a provider controller 140 is a software application loaded on the requestor device 120 or the provider device 135 for commanding and directing communications enabled by the requestor device 120 or the provider device 135. Other examples include a program, a piece of code, an instruction, a device, a computer, a computer system, or a combination thereof, for independently or collectively instructing the requestor device 120 or the provider device 135 to interact and operate as described. The requestor controller 125 and the provider controller 140 may be embodied permanently or temporarily in any type of machine, component, physical or virtual equipment, storage medium, or propagated signal capable of providing instructions to the requester device 120 or the provider device 135.

The communications link 115 typically includes a delivery network 160 making a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway. The delivery network 160 may be any type of network that carries data including, for example, the Internet, an intranet or any combination of data bearing networks. The data network 160 may be, for example, a data network using Internet Protocol (IP). The term "data" as used herein is representation of information in a formalized manner suitable for communication, interpretation or processing. This information can include, for example, text, audio, image, video, and/or multimedia.

An electronic information store 180 may be connected to the provider system 110, included as a component of the provider system 110, and/or connected to the delivery network 160. The electronic information store 180 may be a repository for electronic information that may be in an indexed and/or searchable format. For example, in one implementation, the electronic information store 180 may be used to store information related to the relationships between the linked accounts of the communications system 100.

FIG. 2 illustrates a communications system 200 including a requestor system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requester device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., stand alone e-mail client or AOL client, CompuServe client, AIM client, AOL TV client, or ISP client, all of which may include a built-in or embedded e-mail or instant messaging client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and also capable of supporting a web-based e-mail client and a web-based instant messaging client.

The general-purpose computer 270 also includes a central processing unit 282 (CPU) for executing instructions in response to commands from the requestor controller 225. In one implementation, the requester controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer 270 also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requestor device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requester device 220 by accessing the delivery network 260 and communicating with the provider system 210. Furthermore, the requester system 205 may include one, some or all of the components and devices described above.

FIG. 3 illustrates a communications system 300 that includes a requestor system 305 communicating with a provider system 310 through a communications link 315. The communications link 315 may include communications pathways 350 and 355 that enable communications through one or more delivery networks 360. Examples of the elements within the communications system 300 are broadly described above with respect to FIGS. 1 and 2. In particular, the requestor system 305 and the communications link 315 typically have attributes comparable to those described with respect to the requestor system 105 and 205 and the communications links 115 and 215 of FIGS. 1 and 2. Likewise, the provider system 310 of FIG. 3 typically has attributes comparable to and illustrates one possible implementation of the provider system 110 and 210 of FIGS. 1 and 2.

The provider system 310 includes a gateway server 370, an administrative ("ADMIN") server 372, an authentication server 374, an authentication database 376, an account linking server 378, an account linking database 380, and an instant messaging server 382.

The gateway server 370 communicates with the requestor system 305 over the delivery network 360 through a web server 384 regarding account linking and unlinking actions. In one implementation, the gateway server 370 receives account linking and unlinking requests and forwards them to the admin server 372.

The admin server 372 acts as a clearinghouse for the account linking information management and linked account validation functions. The admin server 372 manages the account linking information and profiles in association with each screen name. The admin server 372 is configured to process requests received from the gateway 370 and saves linking information from successful processes in the account linking database 380 through the account linking server 378. Linking information from unsuccessful processes typically is not stored or saved. The admin server 372 typically is configured to communicate a response message to the requestor system 305 through the gateway server 370, web server 384, and delivery network 360.

The authentication server 374 is configured to process and to validate account authentication requests from the admin server 372 against the authentication database 376 and any partner database system 386. Once accounts have been validated, the admin server may be configured to update that information in the account linking database 389 through the account linking server 378. Accounts may be authenticated and validated on different basis including the presence of a correct account name and password. For validated accounts, account attributes may be forwarded from the authentication database 376 through the authentication server 374 for further use, processing, and/or storage by the admin server 372. For accounts that are not maintained by the provider system 310, the authentication server 374 is configured to communicate the authentication requests to an appropriate partner database system 386 for authentication and validation.

The account linking server 378 interacts with the account linking database 380, which stores and maintains user buddy list and account linking information. The account linking server 378 is configured to manage the information flow to and from the account linking database 380. The type of information contained in the account linking database 380 may include, but is not limited to, users settings of account linking information. The account linking information may be organized in different manners. In one exemplary implementation, the account linking information is organized by screen name. In other implementations, the account linking information may be organized by guide, a unique identifier used in the Open Name Space.

Other types of information contained in the account linking database 380 may include a list of alias screen names linked by a particular screen name, linking attributes associated with each screen name (e.g., timestamp for which an alias account whose password was last changed at the time when the link is created and default visibility/presence preferences), and linking profile information (e.g., revalidation information and a linking account order).

The instant messaging server 382 is configured to process communications sent to and received by users of the communications system. The instant messaging server 382 interacts with the account linking database 380 through the account linking server 378 and also interacts with the admin server 372 to request and receive authentication information using the authentication server 374 and the authentication database 376. Once a user of the requester system 305 has been authenticated and the user's different accounts have been linked and the user has been signed-on to the linked accounts, the user may send and receive communications by interacting with the instant messaging server 382 using the delivery network 360.

An account is needed to use the communications systems 100, 200, and 300. Each account typically has at least one associated screen name. The screen name is the identifier of the account that is authenticated by a client of the communications system. Communications sent throughout the communications system are addressed by the screen names of the intended recipient accounts.

Figure 4:
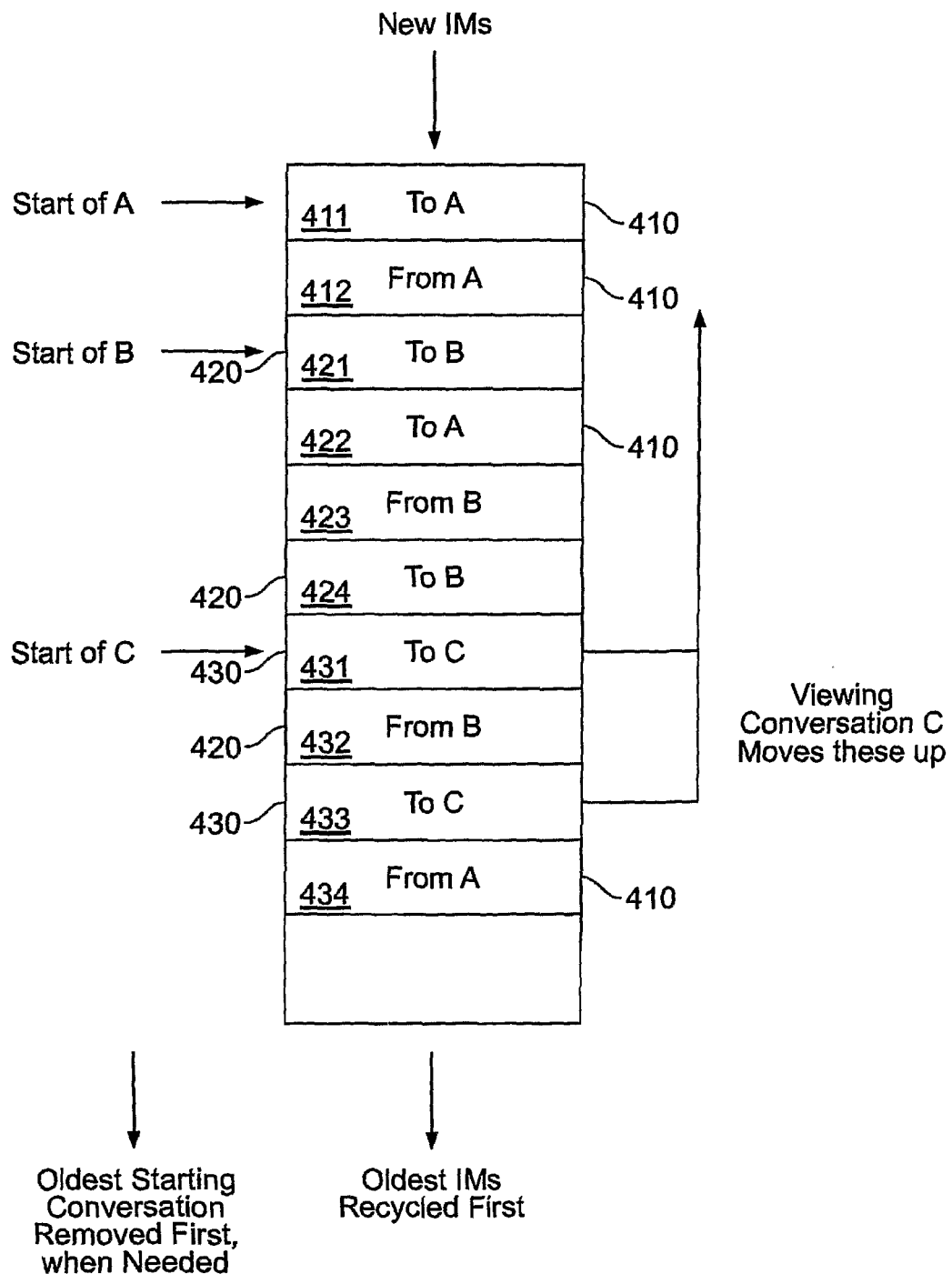
FIG. 4 is an exemplary block diagram of an interface for managing conversations between a user identity and other user identities.

Referring to FIG. 4, an exemplary list-defined user interface for an instant messaging or chat conversation session includes three conversations 410, 420, 430 and respective messages 411-412, 421-424, and 431-434 to and from user identities A, B, and C engaged with a recipient user identity in possession of the client device. Conversation A includes any messages to and from recipient user identity A, e.g., messages 411, 412, 422, and 434. Conversation B includes any messages to and from recipient user identity B, e.g., messages 421, 423, 434, and 432. Conversation C includes any messages to and from recipient user identity C, e.g., messages 431 and 433.

The list-defined user interface 400 is configured to support up to five open conversations (A-C shown), including conversations with unlisted user identities, e.g., user identities who are not already listed in a contact list. However, any number of open conversations may be permitted to optimize available screen space and/or to accommodate preferences of the individual recipient user identity utilizing the mobile client device. The list-defined user interface 400 shown in FIG. 4 is a top-level sorted list (e.g., conversations share a fixed amount of space for messages, such as a maximum of 20 instant messages that have been sent and/or received) that maintains the messages in order of most recent to oldest, with the newest message being placed at the top of the order top-level sorted list. As seen in FIG. 4, each time the user views a conversation, e.g., viewing conversation C (430), results in the two most recent messages being brought to the top, as if these messages had just been sent or received by the user. However, the number of messages that are brought to the top may be increased or decreased to optimize capabilities of individual client devices and/or to enable the user of the client device to control default settings.

Once all available space or memory is used by messages within the interface 400, one or more of the oldest messages are removed or queued for later retrieval from the conversation list each time a new message is sent or received for any ongoing conversation A-C. Accordingly, messages are removed, as necessary, to accommodate new inbound messages. However, the two most recent messages, or any other default number, in each conversation are maintained within the list to allow the user to perceive the contents or focus of any active conversation.

Additionally, or alternatively, a limited number of conversations, e.g., five conversations may be maintained within the user interface 400. For example, if a new conversation is initiated when five current conversations are already open, the oldest conversation, and the associated messages, is removed or queued, e.g., the conversation with the oldest message activity level will be removed from the list. Alternatively, or additionally, the user of the client device may also designated that a conversation be closed to recoup available space within the user interface 400.

Accordingly, an exemplary memory management technique illustrated by the user interface 400 in FIG. 4 reuses the available space of the user interface while preserving conversations as long as possible. For example, the conversations A-C share a fixed amount of space for messages, e.g., a minimum or maximum of twenty messages (sent and received) total, the messages 411-412, 421-424, and 431-434 are ordered from the most recent to the oldest, and each new message is put at the top of the order. Each time the user views a conversation, a preset number of most recent messages are brought to the top of the list, e.g., as if these messages 431, 433 had just been sent or received to recipient user identity C. Once all available space within the user interface 400 is used (not shown in FIG. 4), the occurrence of a new message, e.g., a message being sent by the user of the client device or received by the user of the client device, will result in the removal of one or more of the oldest messages from any conversation, e.g., if space or memory are required. However, the two most recent messages in each conversation are maintained in the list if the conversation is maintained.

Figure 5A:
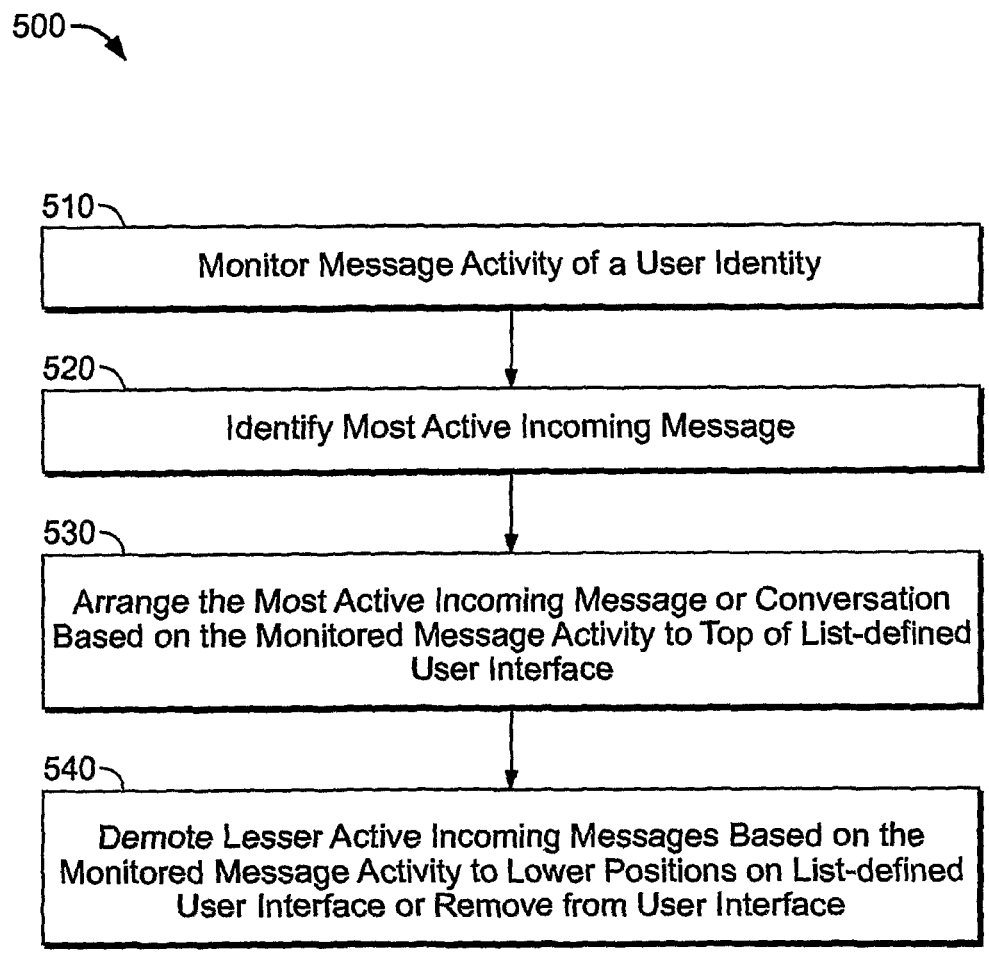
FIG. 5A is a flow chart illustrating a process for ordering incoming messages based on monitored message activity.

Referring to FIG. 5A, an exemplary process 500 for ordering messages and conversations within a graphical user interface includes monitoring message activity (510) of a recipient user identity, e.g., a recipient user identity viewing messages in a graphical user interface provided in a mobile client device, e.g., a PDA. Monitoring message activity may include a determination of any messaging communications between the recipient user identity and any other online user identities sending messages to the recipient user or receiving messages from the recipient user. For example, the client device or messaging host may monitor message communications associated with the recipient user to determine a level of messaging activity, e.g., tracking most recent messages received by the recipient user, messages most recently sent by the recipient user, and/or messages most recently viewed by the recipient user. In addition, activity of the recipient user may be monitored by other indicators to gauge the recipient user's interaction with ongoing conversations, e.g., elapsed time since most recent recipient user activity. Alternatively, or additionally, the subject matter and/or message recipients of ongoing messages may be monitored to assist in evaluating the relevance of incoming and outgoing messages to each other, e.g., if the messages are not direct replies to one another. However, the client device will enable the recipient user to respond to incoming messages, such as instant messages, by viewing the message and responding directly to the sender of the viewed message.

While monitoring the message activity of the recipient user identity, the client is able to identify the most active incoming message from one or more incoming messages directed to the recipient user identity (520). The most active incoming message or conversation based on the monitored message activity is arranged to a prominent position, e.g., the top of the list-defined user interface 400 shown in FIG. 4 (530). As more active incoming messages are received for the recipient user identity, lesser active incoming messages may be demoted to a position of lesser prominence, e.g., such as to a lower position within the list-defined user interface 400 shown in FIG. 4. Alternatively, or additionally, lesser active messages (and conversations) may be removed entirely from the active screenspace depending upon available space and memory configurations associated with the user interface 400.

Figure 5B:
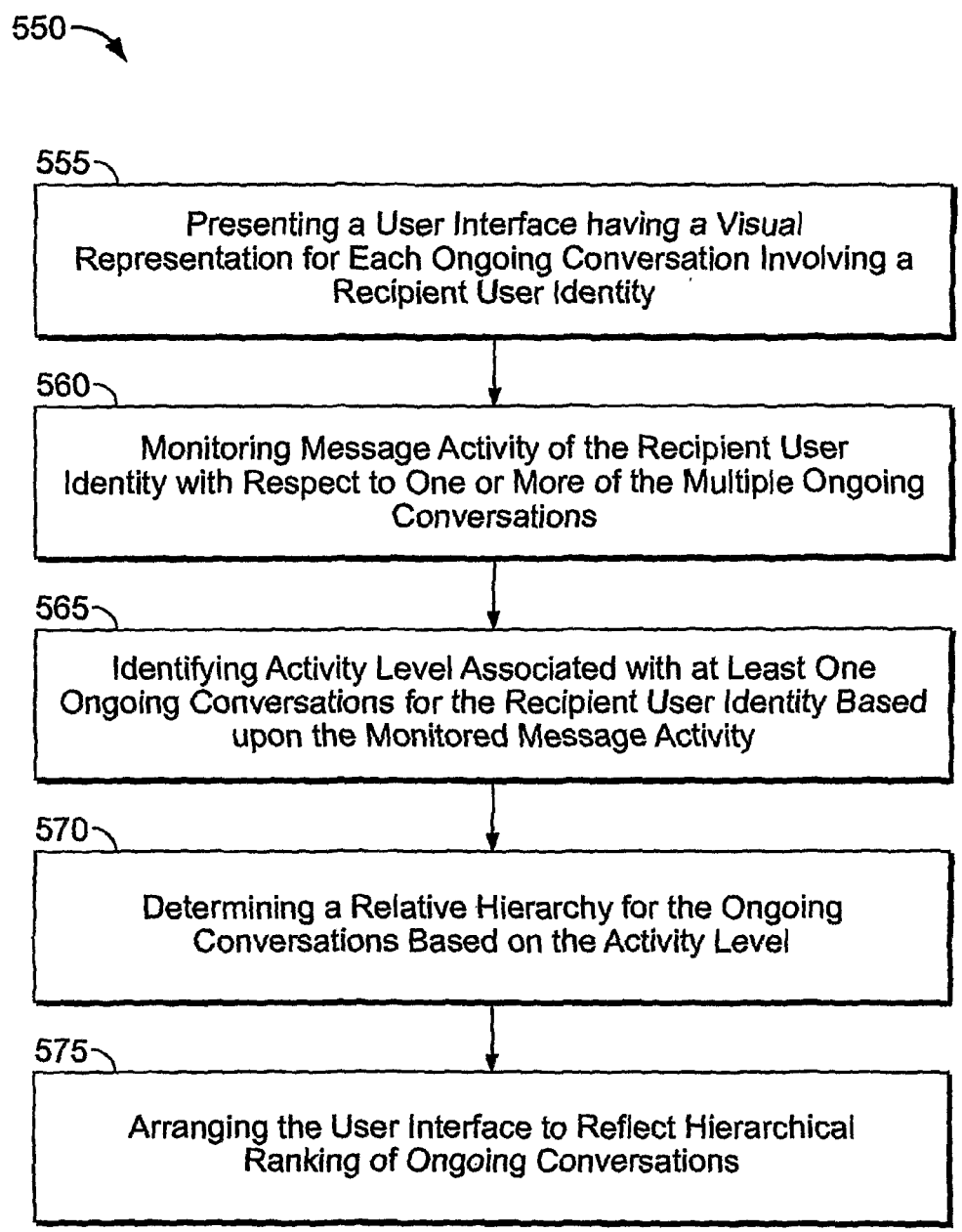
FIG. 5B is a flow chart illustrating an exemplary process for arranging the user interface based on monitored message activity.

Referring to FIG. 5B, an exemplary process 550 for reordering the messages and/or conversations within a user interface includes presenting a user interface having a visual representation for each of multiple ongoing conversations involving a recipient user identity who is associated with each of the conversations (555). The user interface will include a visual representation, e.g., such as an icon, item within a list-defined user interface, that delineates the ongoing conversations that a recipient user is engaged. Exemplary user interfaces will be described in greater detail hereinafter with respect to FIGS. 6-15.

The message activity of the recipient user identity with respect to one or more of the multiple ongoing conversations is monitored (560) by the client or host. The message activity is monitored based on interaction of the recipient user identity with one or more incoming messages. For example, the recipient user may have recently viewed a message or been in engaged in a conversation, such as recently sending an outbound message relating to an ongoing conversation. Alternatively, or additionally, the recipient user identity may have recently received an incoming message related to an ongoing conversation or previously viewed message. As new messages are received, only those messages relating to the more active, or most active conversations are presented to the recipient user identity. Further, in one implementation, if the recipient user identity has not yet viewed previously received, incoming messages related to an ongoing conversation, the recipient user will not receive the latest (newest) incoming message until all previously related, unread messages have been viewed. Accordingly, in this implementation, the recipient user identity is presented with incoming messages most relevant to ongoing conversations and/or in an order that is manageable and logical with respect to the natural flow of a conversation.

determining a relative hierarchy for the ongoing conversations based on the activity level associated therewith; and arranging the user interface such that a conversation having a relatively high activity level is positioned to reflect hierarchical prominence in comparison to another conversation having a relatively low activity level.

The message activity of the recipient user identity is then used to identify the activity level associated with at least one of the ongoing conversations for the recipient user identity based upon the monitored message activity (565). The activity level is based upon the monitored message activity, which includes the recipient recipient's user identity's interaction with one or more ongoing conversations associated with the incoming message. A relative hierarchy for the ongoing conversations is determined based on the activity level associated with the at least one incoming message (570). The user interface is then arranged to promote conversations associated with an incoming message having a relatively high activity level to position which reflect the hierarchical prominence of the conversation, e.g., in comparison to other conversations associated with an incoming message having a relatively low activity level.

Figure 5C:
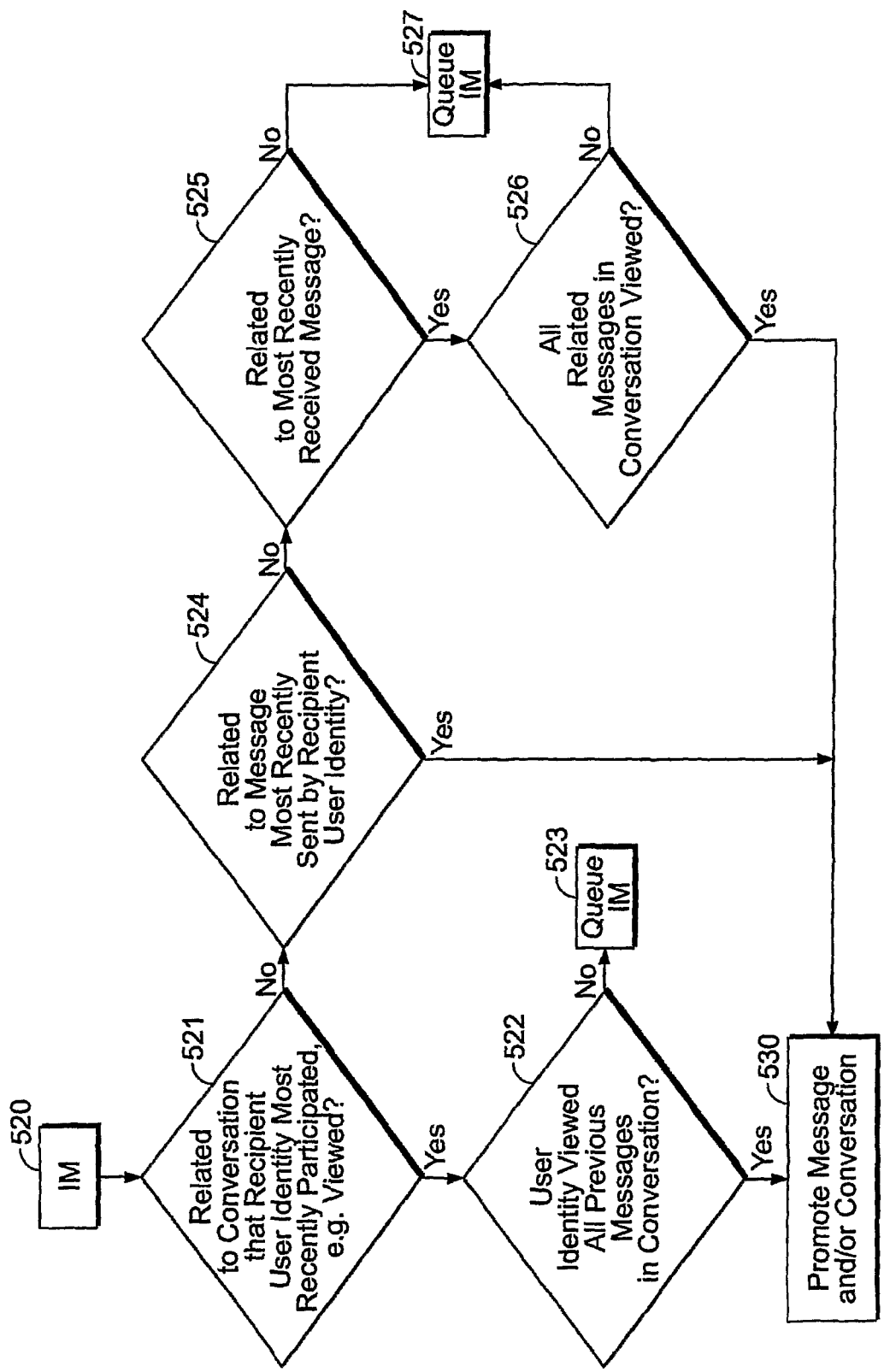
FIG. 5C is an expanded flowchart of a process for identifying a most active incoming message and related conversation and for promoting the most active conversation and incoming message.

Referring to FIG. 5C, an exemplary hierarchical process 580 is illustrated for identifying activity level associated with at least one incoming message and/or for limiting the reordering of incoming messages based on activity level. For example, the process 580 illustrated in FIG. 5C may be integrated into or utilized in previously described steps 560-570 of process 550 (FIG. 5B) and/or in steps 510-520 of process 500 (FIG. 5A). For example, an incoming message 520 is first evaluated by the client to determine if the message is related to any ongoing conversations that the recipient user identity has recently participated, e.g., recently viewed or otherwise interacted with the ongoing conversation (521). If the incoming message is related to a recent conversation, the client then ascertains if the recipient user identity 522 has viewed all previously received messages associated with the ongoing conversation (522). If the user has viewed all previous messages, the incoming message and/or conversation is promoted to a prominent position within the user interface, e.g., such as to the top of the list-defined user interface 400 of FIG. 4 (or FIG. 8, user interface 800). If the user has not yet viewed all previous messages relating to the ongoing message, the message is not forwarded to the user, e.g., the message is queued until all previous messages have been received (523).

If the message is not related to a conversation that the recipient user identity most recently participated, e.g., viewed, then the message is next analyzed to determine if the message relates to a message that was most recently sent by the recipient user identity (524). If the message is related to a message that was most recently sent by the recipient user identity, the message and/or the associated conversation are promoted to a position of prominence within the user interface (530). If the message is not related to a message that was most recently sent by the recipient user identity, a determination of whether the message is related to (or is) the most recently received message associated with an ongoing conversation (525) is made. If the message is not related to, or is not, the most recently received message in an ongoing conversation, the message is queued (527) for presentation to the recipient user identity at a later time or by the recipient user manually retrieving the new message. If the message is the most recently received message in an ongoing conversation, or related to the most recently received message associated with the conversation, the message is then analyzed to see if all previously received incoming messages have been viewed by the user (526). If all previously received incoming messages have been viewed by the recipient user identity, the incoming message and/or the related conversation are promoted to a position of prominence within the user interface. If all of the previously received incoming messages have not been viewed by the user, the incoming message is queued until the previously received messages have been actually viewed by the recipient user identity or removed by some activity of the recipient user identity, e.g., deleting or removing unread messages.

Messages that are queued 523, 527 may be queued at the host or locally at the client device. By queuing the messages until such time that available screen space, memory or specific user request justify forwarding the message to the recipient user identity's messaging user interface, the recipient user identity receives messages in an efficient manner that optimizes available screen space, user inputs, such as keystrokes or scroll wheel movement, and available memory. The process 580 illustrated in FIG. 5c effectively limits or dampens the forwarding of incoming messages to the recipient user identity's graphical user interface. Alternatively, or additionally, rather than dampening or limiting the forwarding of messages until all previously related, unread messages have been read, e.g., 522, 526, incoming messages may be delayed by a predetermined, elapsed time interval, e.g., new messages are delayed approximately 30 seconds while the user is engaged in active conversations. In addition, the process 580 may be modified to alter how incoming messages are dynamically reordered within an interface. For example, rather than first performing determining step (522) followed by determining step (524), the order of these two steps may be reversed to permit the system to prioritize conversations relating to most recently sent messages as being more active than messages most recently viewed by the user (522).

One or more implementations of the aforementioned processes illustrated in FIGS. 305A-5C within various graphical user interfaces for mobile client devices, e.g., such as list-driven user interfaces, are illustrated in FIGS. 6-15. For example, referring to FIG. 6, an exemplary contact list user interface 600 is illustrated. The user interface 600 includes a status bar 610 which includes operating information relevant to the overall operation of the mobile client device, e.g., such as wireless signal strength and battery capacity, and a header bar 620 (Contact List) that describes the user interface 600. The user interface 600 includes a list of conversations 631, 632 presented to the user of the mobile client device beneath a conversations group 630. Scroll control arrows 660, 665 permit the user to navigate between user identities and conversations, e.g., by moving a scroll wheel upwardly or downwardly, the highlighted entry, e.g., "tweety" 631 in FIG. 6, may be moved manually by the user of the client device. The contract list 620 also includes control option fields 640, 650, which permit the user to send a message 640 to the highlighted entry, e.g., in the example shown to "tweety" or to pull up various menu items 650.

Since messaging is the primary task of users within the interface 600, e.g., in an instant messaging client device, the conversations that a user is participating in must be easily and quickly accessible. Accordingly, the most recent conversations are listed at the top of the top-down list shown. Alternatively, or additionally, any new or recently opened conversations are listed at the top of the contact list, with conversations of lesser activity level appearing lower in the list or not at all in the interface 600.

Referring to FIG. 7, a user interface 700 for a mobile client device includes a sectioned contact list 720, e.g., having multiple subsections as appropriate for the client device. For example, many of the same features of the interface 600 are shown, including a status bar 710, header bar 720, option fields 740, 750, and conversations group 730 at the top of the list-defined interface 700. A single, ongoing conversation 731 is listed beneath the conversations group 730. In addition, beneath the conversations group 730 is a second section of the list, e.g., an online contacts group 735 appearing in another header bar 765. Due to limited screen-space, only the conversations group 730 and just the header bar 765 containing the online contacts group 735 are perceivable by the user of the interface 700. However, by activating scroll arrows 760, 765 to navigate through the list, additional list items are perceivable to the user.

For example, beneath the online contacts group 735 are several online user identities 736, 737, and 738 who are indicated as being available, known contacts who are either currently involved in active conversations 737 (tweety) or simply available for opening new conversations 737, 738. Beneath the online contacts group 730, is an additional group of user identities, e.g., Offline Contacts 770 labeled in header bar 766. In order to view the entries or identities beneath the Offline Contacts group 770, the user would activate scroll arrow 765 to present entries shown at the bottom of FIG. 7, e.g., offline contact fhleghorn 771, offline contact roadrunner 772, and an additional group of identities, Awaiting Authorization 780 which includes the user identity wileecoyote 781 who is awaiting authorization as a known or permissible contact. In addition, an indication of the online states 782 and offline states 783 of various identities may be provided to the user through icons that may be presented within the user interface 700, e.g., next to various online identities or signifying an online state for the client device.

The sectioned contact list shown in FIG. 7 may include one or more of the following sections as appropriate, including but not limited to, conversations, online contacts, offline contacts, and/or awaiting authorization (ICQ platforms). Further, one or more of the contact lists may be divided into sections that are appropriate for each client, e.g., an AIM client may not contain a sub-section of "Awaiting Authorization," while an ICQ client may include the sub-section "Awaiting Authorization." In addition, the client may be configured to provide a default order for the various section, e.g., the sections may appear in the following order, as appropriate or when applicable, "Conversations", "Online", "Offline", and "Awaiting Authorization". "Conversations" are positioned at the top of the list-defined interface to permit the user to readily assess the status of new and existing conversations with online identities. The user identities that have been added to the user's contact list are listed under the "Online" contacts. The "Offline Contacts" list the names of offline contacts, and "Awaiting Authorization" lists the user identities the user would like to add to the contacts list, but has not yet received the authorization to do so.

The client device, or host, manages the user interface 700 and the messages and conversations displayed within the user interface 700 automatically to manage message space and memory efficiently. Alternatively, or in addition, the user is also provided with the option to end, remove, or ignore conversations or messages. Although the user may be provided with the ability to manage memory or screen space, by providing the client with the capability to automatically manage the memory and screen space used by the client, the client manages the messages and memory dynamically to avoid the user being presented with errors, such as "out of memory" and/or requiring the user to manually delete messages.

Since the oldest and least active messages are removed dynamically from the oldest and least active conversations, if or when memory for the client runs low, the user likely will not have to manually manage memory, messages or related conversations. As discussed with respect to the user interface 400 illustrated in FIG. 4, the conversations group of a list-defined user interface may be provided with default conversation limits, e.g., up to five conversations being perceivable by the user at any one time, message limits, e.g., at least two messages are displayed in each conversation and no more than twenty messages are displayed in each conversation, and dynamic arrangement of the messages and conversations. For example, since the messages and/or conversations may be recycled, e.g., removed from the user interface in accordance with activity level, the most active conversations and messages are perceivable to the user. The conversations may be limited to conversations relating to one or more of online contacts, known contacts, and/or unknown contacts.

Referring to FIGS. 8A-8C, exemplary screenshots of a list-driven user interface 800 include conversations 810, online user identities 820, and offline user identities 830. The user interface 800 also includes various menu features 841, 842, 844, 845 that enable the user to select options 841, to navigate backward to a previous screen 842, to select 844 available menu options from a pop-up menu 840, and a cancel feature 845 for closing the menu 840. The list-driven user interface 800 is a "buddy list" for a mobile instant messaging client device. Specifically, the mobile buddy list 800 is a subset of a desktop Buddy List. The servers automatically create a Mobile Device Group on the user's desktop Buddy List and populate it with a predetermined number of buddies, e.g., the first 30 buddies in the list typically displayed in a desktop environment. Accordingly, the mobile Buddy List is auto-populated when the user first signs on, thereby eliminating the necessity of the user having to add buddies' names in order to initiate messaging.

While a desktop buddy list may contain up several hundred buddies, the mobile Buddy List may be limited to a smaller number, e.g., a maximum of 30 user identities or buddies. Although equally applicable to a desktop environment, the mobile buddy list separates Online buddies from Offline buddies, and places all active conversations in the top section of the interface 800. In FIG. 8A, three conversations involving screennames 811-813 are active in the interface 800. Depending on the current state of the screennames 811-813 e.g., currently online of offline, these screennames would appear under the group Online 820 or Offline 830. In this case, the screennames 811-813 are not online, while the conversations involving these screennames are still accessible under the conversations group 810.

Referring to FIG. 8B, if the user wishes to view a message, get buddy info, add/delete/block messages, and/or other options, the user selects the options feature 841 while the appropriate screenname is highlighted.

Referring to FIG. 8C, if the screenname or user identity is a designated buddy, the screenname will appear both in the conversations group 810 (screenname 813) and in the appropriate buddy group 830 (offline, screenname 3 838). The mobile buddy list may include a single listing of messages or separate sections for Conversations, Online buddies, and/or Offline buddies. The Conversations, Online and Offline sections may be visually separated with icons or section headers. When the status of a message or user identity changes, e.g., a user goes offline or a new IM is received, the user is notified. Conversations are dynamically arranged so that the most recently active conversations, e.g., most recently received message, sent message or viewed message, is promoted to the top of the conversations section. In addition, each user identity may be provided with icons next to conversations containing new or unread messages and/or indicating that no new messages have been received. IM, sent IM or viewed) conversation at the top of the section. In addition, screen names that have not been added to the buddy list may be listed in the Online buddy group 820 (but not shown in FIG. 8C).

The user interface 800 shown in FIGS. 8A-8C may include, for example, various features and default settings that may be optimized by the client or user. For example, since messages may be recycled to conserve screen space and memory, the user may be notified of any recycling of messages. A minimum number of messages, e.g., at least two messages and/or a maximum number of messages, e.g., no more than twenty messages, may be preserved within each conversation. The activity level of the user or recent receipt of an incoming message may result in the associated conversation being moved to the top of the list.

Figure 9:
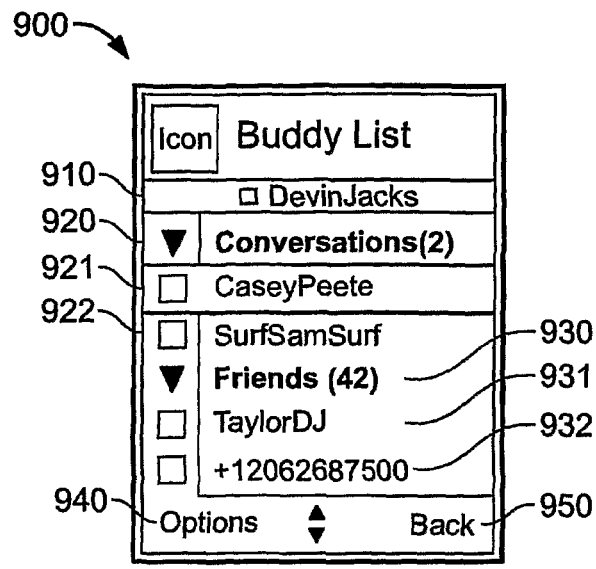
FIG. 9 is an exemplary screenshot of list-defined user interface with an active conversation promoted at the top of a conversation list.
Figure 10:
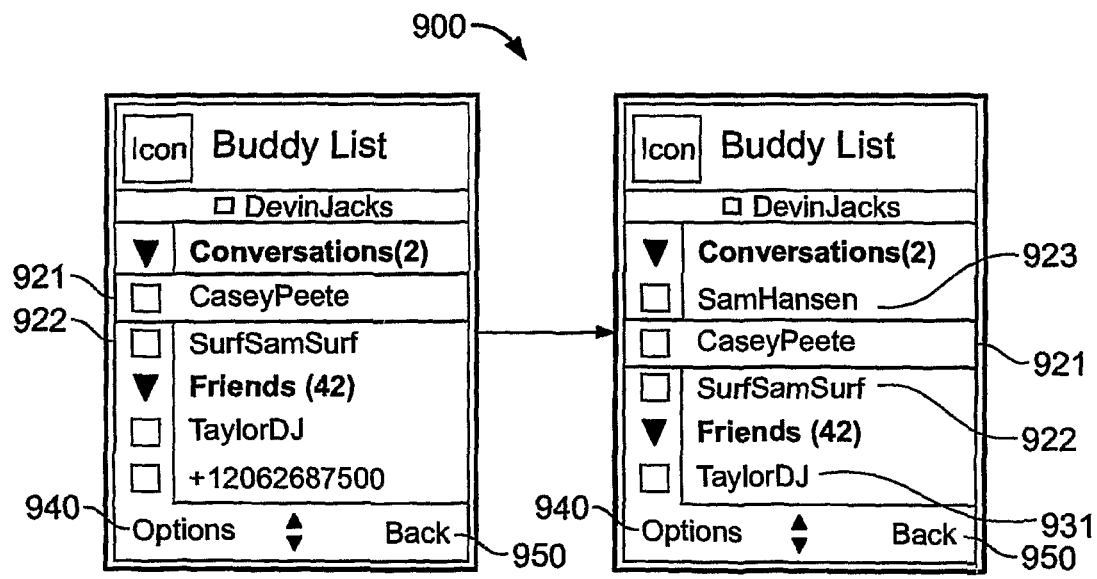
FIG. 10 are exemplary screenshots showing dynamic reordering of the conversation list in response to receiving an incoming message.

Referring to FIGS. 9-10, a user interface 900 for a mobile client device includes a conversations section of the contact list located at the top of the contact list. The interface 900 is similar to the interface 800 in FIGS. 8A-8C. However, the interface 900 is shown initially (FIG. 9) with two conversations 921, 922 beneath the conversations group 920 for user DevinJacks 910. A Friends buddy group 930 is positioned beneath the conversations group 920 and includes two visible screennames, e.g., TaylorDJ 931 and +12062687500 932 (a wireless mobile telephone client). The conversation CaseyPeete 921 is initially at the top of the list and highlighted by the user with use of the scroll tabs. When a new message for SamHansen 923 arrives that is more active than the CaseyPeete conversation, the SamHansen conversation is promoted to the top of the list-driven interface 900.

As a result of the additional conversation being added to the conversation group (from two to three active conversations), the Friends buddy group was moved lower in the interface 900. Accordingly, the "+12062687500" screenname 932 was demoted off of the contact list.

Figure 11:
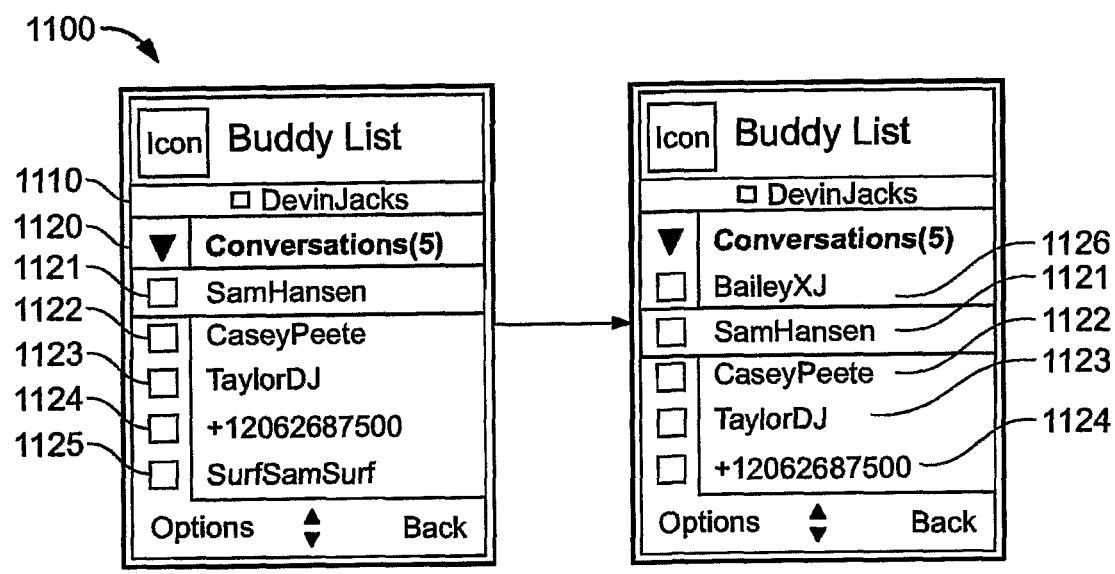
FIG. 11 is an exemplary screenshot showing the promotion of an incoming message and conversation and the removal of a least active conversation and incoming message.

Referring to FIG. 11, conversations exceeding a predetermined limit, e.g., five active conversations, may be removed dynamically from a user interface 1100 upon receiving a more active incoming message. The buddy list for recipient user identity DevinJacks 1110 includes five active conversations 1120-1125. As a new conversation and message is promoted to the top of the list, e.g., BaileyXJ 1126, the previously listed conversation with SurfSamSurf 1125 was recycled off of the user interface. Accordingly, messages, online contacts, and/or conversations may be recycled to accommodate incoming messages or conversations. The dynamic reordering of the conversations ensures that the most relevant conversations are always at the top of the list, and/or makes it easier for users to switch between relevant conversations without having to scroll up and down. By inserting new conversations at the top of the conversations section in the contact list, the user quickly learns where to look to for new messages, without having to scroll through a static list, or searching for or being notified with an indicator, such as an icon or pop-up window, letting the user know which conversations have unread messages.

When the client automatically recycles a lesser active conversation, e.g., when a maximum number of supported conversations is reached, the least active conversation must is automatically ended without prompting the user in order to make space for the new conversation. However, users may also be provided with the capability or option to save a conversation as a separate file. When the maximum number of supported conversations is reached, the least active conversation, e.g., based on recently sending or viewing a related message, is automatically removed from the list when a new conversation is started. Accordingly, users are not interrupted or prompted to manually manage the conversations or messages listed in a user interface.

Referring to FIGS. 12A-12E, a series of screenshots demonstrates how conversations may be maintained while the device is powered off, the user manually ends the conversation, logs in again, or the system replaces the conversation with a new conversation based on conversation management. In FIGS. 12A-12B, an ongoing conversation in a conversation dialogue interface 1200 is interrupted by a low signal strength which interrupts the messaging capability of the client device 1210. After a user establishes adequate signal strength, a user may sign on to the messaging interface 1220 again (FIG. 12C) and resume previous conversations searchable through the interface 1230 by selecting on the conversations option 1232. The user may then resume the conversation with any of the screennames SurfSamSurf 1252 or CaseyPeete 1251 by selecting the appropriate conversation listed under the conversations group 1250 in the contact. A conversation may not be ended as soon as a user navigates away from the conversation, e.g., the user may be permitted an elapsed time period, such as two minutes, to decide whether the user wishes to either resume the conversation at a later time or review the conversation history. If the client device loses signal, the conversations may be maintained for a predetermined period of time or until at least signal strength is recovered. Additionally, or alternatively, the powering off of the mobile device may end all of the conversations or permit the conversations to be saved. Additionally, or alternatively, logging out may result in all conversations be removed from the client device.

Referring to FIGS. 13A-13D, the conversations category of the contact list may be dynamically reordered based on the activity of each conversation. User interface 1300 is shown in various states 1300, 1310, 1320, and 1330, including a first state 1300 (FIG. 13A) where a new message 1308 is indicated as being received for the contact TaylorDJ 1306. The user may select the highlighted screenname 1312 as seen in FIG. 13B, thus promoting the TaylorDJ message to an active conversation 1312 at the top of the list. As seen in FIG. 13D, a conversation dialogue box 1340 shown in state 1330 is presented to the user (to permit a conversation with TaylorDJ 1335.

Figure 14:
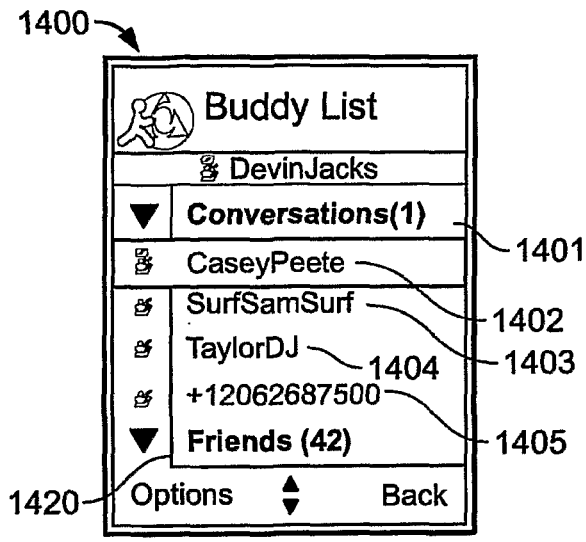
FIG. 14 is an exemplary screenshot showing active conversations, inactive conversations, and online user identities on the same screen.
Figure 15:
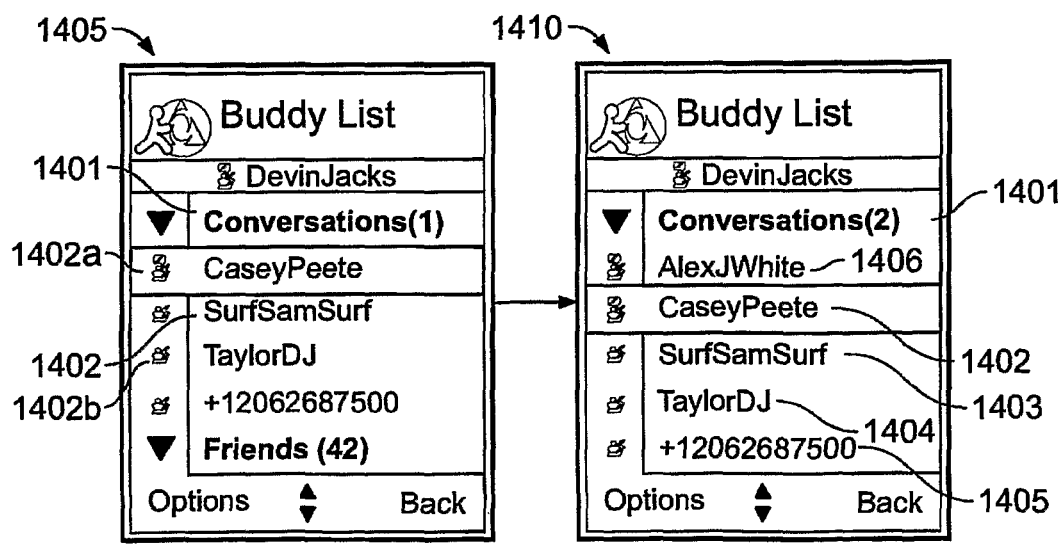
FIG. 15 is an exemplary screenshot showing the dynamic reordering of a new conversation to the top of a list-defined user interface and the removal of an online user identity group.

Referring to FIGS. 14-15, a user interface 1400 having a dynamically reordered conversations group 1401 includes multiple conversations 1401-1405. As a new conversation, AlexJWhite 1406 is added to the conversation group 1401, the Friends group 1420 is demoted and recycled off of the user interface 1400. In addition, the conversations window shows two active conversations (with unread messages) and three lesser conversations (with all messages read). The icons 1402a indicate if a new or unread message is available and/or also indicate if no new messages have been received 1402b. In the final state shown in FIG. 15, the conversations window includes five conversations, e.g., additional conversations will result in demotion of the least active conversation (+12062687500) 1405 with any new incoming conversations.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method comprising the following operations performed with at least one processor:

presenting a user interface having a visual representation for each of multiple ongoing conversations involving a recipient user identity who is associated with each of the conversations;

monitoring message activity of the recipient user identity with respect to one or more of the multiple ongoing conversations based on interaction of the recipient user identity with one or more incoming messages;

identifying an activity level associated with each of the ongoing conversations for the recipient user identity based upon the monitored message activity, wherein identifying the activity level comprises determining if at least one unviewed incoming message is associated with a conversation most recently viewed by the recipient user identity;

determining a relative hierarchy for the ongoing conversations based on the activity level associated therewith;

queuing a lesser active incoming message upon reaching a predetermined number of incoming messages; and dynamically reordering, in response to an incoming or outgoing message, the ongoing conversations displayed in the user interface based on the relative hierarchy, such that a conversation having a relatively high activity level is positioned to reflect hierarchical prominence in comparison to another conversation having a relatively low activity level.

2. The computer-implemented method of claim 1, wherein the at least one incoming message is associated with recipient user identity interaction with the conversation and the conversation is displayed in the user interface.

3. The computer-implemented method of claim 1, wherein the at least one incoming message is associated with a most recently viewed conversation for the recipient user identity.

4. The computer-implemented method of claim 1, wherein the at least one incoming message is associated with the message most recently sent by the recipient user identity.

5. The computer-implemented method of claim 1, wherein identifying the recipient user identity activity level further comprises determining if a most active incoming message of the one or more incoming messages is associated with an outgoing message most recently sent by the recipient user identity.

6. The computer-implemented method of claim 1, wherein identifying the recipient user identity activity level further comprises determining if a most active incoming message of the one or more incoming messages is a message most recently received for the recipient user identity.

7. The computer-implemented method of claim 1, wherein identifying the recipient user identity activity level comprises determining if a most active incoming message of the one or more incoming messages is associated with an outgoing message most recently sent by the recipient user identity.

8. The computer-implemented method of claim 7, wherein identifying the recipient user identity activity level further comprises determining if a most active incoming message of the one or more incoming messages is associated with a conversation most recently viewed by the recipient user identity.

9. The computer-implemented method of claim 7, wherein identifying the recipient user identity activity level further comprises determining if a most active incoming message of the one or more incoming messages is a most recently received message for the multiple ongoing conversations and the recipient user identity.

10. The computer-implemented method of claim 1, further comprising removing a lesser active conversation from the user interface upon reaching a predetermined number of conversations.

11. The computer-implemented method of claim 1, further comprising removing a lesser active conversation from the user interface upon reaching a predetermined amount of memory.

12. The computer-implemented method of claim 1, further comprising queuing a lesser active incoming message upon reaching a predetermined amount of memory.

13. The computer-implemented method of claim 1, wherein identifying the recipient user identity activity level comprises repeatedly evaluating incoming messages received by the recipient user according to a predetermined time interval.

14. The computer-implemented method of claim 13, wherein repeatedly evaluating incoming messages comprises evaluating queued messages that have not been viewed by the recipient user.

15. The computer-implemented method of claim 1, further comprising providing an indicator to the recipient user identity reflecting arrival of a most active incoming message.

16. The computer-implemented method of claim 1, further comprising queuing incoming messages associated with an active conversation until all previously received messages in the active conversation have been viewed by the recipient user identity.

17. The computer-implemented method of claim 1, wherein dynamically reordering, in response to an incoming or outgoing message, the ongoing conversations displayed in the user interface comprises reordering incoming messages periodically after a predetermined interval of elapsed time.

18. The computer-implemented method of claim 1, further comprising deemphasizing an incoming message within the user-interface relative to another incoming message based on a determination that the incoming message is less active than the other incoming message.

19. The computer-implemented method of claim 1, wherein dynamically reordering, in response to an incoming or outgoing message, the ongoing conversations displayed in the user interface comprises emphasizing an active incoming message with an indicator notifying the recipient user identity of an incoming message.

20. The computer-implemented method of claim 1, further comprising emphasizing an active incoming message within the user interface.

21. The computer-implemented method of claim 1, wherein identifying the recipient user identity activity level comprises determining whether a predetermined condition is satisfied based upon the monitored message activity.

22. The computer-implemented method of claim 21, further comprising queuing incoming messages until the predetermined condition is satisfied.

23. The computer-implemented method of claim 21, further comprising queuing incoming, lesser active messages until the predetermined condition is satisfied.

24. The computer-implemented method of claim 21, wherein the predetermined condition is satisfied when a predetermined time period has elapsed.

25. The computer-implemented method of claim 21, wherein the predetermined condition is satisfied when a subsequent, more active incoming message is received for the recipient user identity.

26. The computer-implemented method of claim 21, wherein the predetermined condition is satisfied when a predetermined amount of memory is available for managing incoming messages.

27. The computer-implemented method of 21, wherein the predetermined condition is satisfied if the recipient user identity's activity is active within the user interface for at least a predetermined amount of time.

28. The computer-implemented method of claim 1, wherein the user interface is a list-driven user interface.

29. The computer-implemented method of claim 1, wherein the user interface is a list-driven user interface for a mobile client device.

30. The computer-implemented method of claim 29, wherein the mobile client device is a mobile telephone.

31. The computer-implemented method of claim 29, wherein the mobile client device is a personal digital assistant.

32. The computer-implemented method of claim 29, wherein the mobile client device is a personal computer.

33. The computer-implemented method of claim 1, wherein the user interface is a list-driven user interface for a desktop computer.

34. The computer-implemented method of claim 1, wherein the user interface is a pop-up windows interface for electronic messaging.

35. The computer-implemented method of claim 1, wherein the user interface is an instant messaging user interface.

36. The computer-implemented method of claim 1, wherein the user interface is a group chat conversation user interface.

37. The computer-implemented method of claim 1, wherein the user interface is an e-mail messaging user interface.

38. The computer-implemented method of claim 1, further comprising providing an indication to a sending user identity of an incoming message that the recipient user identity has not received notification of the incoming message.

39. The computer-implemented method of claim 1, further comprising providing an indication to a sending user identity of an incoming message that the recipient user identity has not viewed the incoming message.

40. The computer-implemented method of claim 1, wherein monitoring the activity level of the recipient user identity comprises monitoring activity of the recipient user identity within the user interface.

41. The computer-implemented method of claim 1, further comprising enabling the recipient user identity to respond to a most active incoming message of the one or more incoming messages by selecting a predetermined message from among a set of predetermined messages and delivering the predetermined message to a sending user identity of the most active incoming message.

42. The computer-implemented method of claim 1, wherein determining a relative hierarchy for the ongoing conversations based on the activity level associated therewith further comprises:
    determining that an ongoing conversation associated with a most recently received message for the multiple ongoing conversations and the recipient user identity has a relatively low activity level if the most recently received message is not associated with the conversation most recently viewed by the recipient user identity.

43. A computer-implemented system, the system comprising:
a memory that stores instructions; and
at least one processor that executes the instructions to perform operations comprising:
presenting a user interface having a visual representation for each of multiple ongoing conversations involving a recipient user identity who is associated with each of the conversations;
monitoring message activity of the recipient user identity with respect to one or more of the multiple ongoing conversations based on interaction of the recipient user identity with one or more incoming messages;
identifying an activity level associated with at least one of the ongoing conversations for the recipient user identity based upon the monitored message activity, wherein identifying the activity level comprises determining if at least one unviewed incoming message is associated with a conversation most recently viewed by the recipient user identity;
determining a relative hierarchy for the ongoing conversations based on the activity level associated therewith;
queuing a lesser active incoming message upon reaching a predetermined number of incoming messages; and
dynamically reordering, in response to an incoming or outgoing message, the ongoing conversations displayed in the user interface based on the relative hierarchy, such that a conversation having a relatively high activity level is positioned to reflect hierarchical prominence in comparison to another conversation having a relatively low activity level.

44. The computer-implemented system of claim 43, wherein the user interface is a list-defined user interface.

45. The computer-implemented system of claim 43, wherein the user interface is a pop-up windows user interface.

46. The computer-implemented system of claim 43, wherein the at least processor further executes the instructions to perform operations comprising:
determining that an ongoing conversation associated with a most recently received message for the multiple ongoing conversations and the recipient user identity has a relatively low activity level if the most recently received message is not associated with the conversation most recently viewed by the recipient user identity.

47. A non-transitory computer-readable medium storing computer-executable instructions that, when executed by at least one processor, cause the at least one processor to perform a method, the method comprising:
presenting a user interface having a visual representation for each of multiple ongoing conversations involving a recipient user identity who is associated with each of the conversations;
monitoring message activity of the recipient user identity with respect to one or more of the multiple ongoing conversations based on interaction of the recipient user identity with one or more incoming messages;
identifying an activity level associated with at least one of the ongoing conversations for the recipient user identity based upon the monitored message activity, wherein identifying the activity level comprises determining if at least one unviewed incoming message is associated with a conversation most recently viewed by the recipient user identity;
determining a relative hierarchy for the ongoing conversations based on the activity level associated therewith;
queuing a lesser active incoming message upon reaching a predetermined number of incoming messages; and
dynamically reordering, in response to an incoming or outgoing message, the ongoing conversations displayed in the user interface based on the relative hierarchy, such that a conversation having a relatively high activity level is positioned to reflect hierarchical prominence in comparison to another conversation having a relatively low activity level.

48. The non-transitory computer-readable medium of claim 47, wherein determining a relative hierarchy for the ongoing conversations based on the activity level associated therewith further comprises:
determining that an ongoing conversation associated with a most recently received message for the multiple ongoing conversations and the recipient user identity has a relatively low activity level if the most recently received message is not associated with the conversation most recently viewed by the recipient user identity.

* * * * *